(12) United States Patent
Schreiner et al.

(10) Patent No.: US 12,692,159 B2
(45) Date of Patent: Jul. 28, 2026

(54) MANUFACTURING OF CARBON-CONTAINING PARTICLES

(71) Applicant: SGL CARBON SE, Wiesbaden (DE)

(72) Inventors: Christian Schreiner, Meitingen (DE); Christian Napholcz, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 763 days.

(21) Appl. No.: 17/914,560

(22) PCT Filed: Mar. 24, 2021

(86) PCT No.: PCT/EP2021/057539
§ 371 (c)(1),
(2) Date: Sep. 26, 2022

(87) PCT Pub. No.: WO2021/191259
PCT Pub. Date: Sep. 30, 2021

(65) Prior Publication Data
US 2023/0159333 A1 May 25, 2023

(30) Foreign Application Priority Data

Mar. 26, 2020 (DE) .......................... 102020203927.5

(51) Int. Cl.
*C01B 32/05* (2017.01)
*C09C 1/48* (2006.01)

(52) U.S. Cl.
CPC ............... *C01B 32/05* (2017.08); *C09C 1/48* (2013.01); *C01P 2004/62* (2013.01); *C01P 2006/40* (2013.01)

(58) Field of Classification Search
CPC ....... C09C 1/48; C01B 32/05; C01P 2004/62; C01P 2006/40
See application file for complete search history.

(56) References Cited

U.S. PATENT DOCUMENTS

| | | | | |
|---|---|---|---|---|
| 4,431,624 A | * | 2/1984 | Casperson | ............... B01J 4/001 |
| | | | | 422/150 |
| 4,900,465 A | * | 2/1990 | Nakada | ..................... C09C 1/56 |
| | | | | 252/62.51 R |

| | | | | |
|---|---|---|---|---|
| 7,115,221 B1 | * | 10/2006 | Spahr | ........................ C09C 1/46 |
| | | | | 429/535 |
| 11,843,112 B2 | * | 12/2023 | Roethinger | ........... H01M 4/625 |
| 2002/0126439 A1 | * | 9/2002 | Sato | ..................... C01B 32/348 |
| | | | | 361/502 |
| 2010/0009160 A1 | * | 1/2010 | Noguchi | ................ B82Y 40/00 |
| | | | | 428/297.4 |
| 2016/0024270 A1 | * | 1/2016 | Schwaiger | ............. B82Y 30/00 |
| | | | | 422/198 |
| 2020/0119353 A1 | * | 4/2020 | Jang | ....................... H01M 4/625 |
| 2021/0171353 A1 | * | 6/2021 | Gulas | ...................... C08L 87/00 |

FOREIGN PATENT DOCUMENTS

| | | | |
|---|---|---|---|
| DE | 10328342 | B4 | 5/2006 |
| DE | 102015006238 | A1 | 11/2016 |
| DE | 102018205152 | A1 | 10/2019 |
| EP | 2905096 | A2 | 8/2015 |
| WO | 2017140645 | A1 | 8/2017 |

OTHER PUBLICATIONS

International Search Report, issued on Jun. 7, 2021, in corresponding International Patent Application No. PCT/EP2021/057539; 6 pages.
German Office Action, issued on Nov. 25, 2020, in corresponding German Patent Application No. 10 2020 203 927.5; 17 pages.
Wagner, J.: High-performance powders at the cutting edge: Continuous powder synthesis sets standards. In: CITplus, 22, 2019, 11, pp. 41-43; ISSN 1436-2597.
Lai, J.; et al: Preparation and characterization of flake graphite/silicon/carbon spherical composite as anode materials for lithium-ion batteries. In: Journal of Alloys and Compounds, 530, 2012, pp. 30-35; ISSN 0925-8388.
Li, S.; et al.: Silicon/carbon composite microspheres with hierarchical core-shell structure as anode for lithium ion batteries. In: Electrochemistry communications, 49, 2014, pp. 98-102; ISSN 1388-2481.

* cited by examiner

*Primary Examiner* — Stuart L Hendrickson
(74) *Attorney, Agent, or Firm* — Maier & Maier, PLLC

(57) ABSTRACT

A method for manufacturing a carbon-containing particulate product. A starting material containing a carbonisable precursor material and/or carbon is dispersed in a gas and is conducted through a reaction zone in which at least some of the carbon contained in the product is formed, the gas flowing in a pulsed manner at least in the reaction zone.

12 Claims, 3 Drawing Sheets

Fig. 1

MANUFACTURING OF CARBON-CONTAINING PARTICLES

FIELD

The present invention relates to a method for manufacturing carbon-containing particulate products, carbon-containing particulate products and their use for manufacturing an anode of a battery.

BACKGROUND

It is known that certain particles may be formed or changed in a targeted manner in a gas flow. The materials in this case are gas-borne, i.e., dispersed in a carrier gas.

DE 10 2006 022 866 A1 describes the synthesis of a carbon granulate in a nitrogen gas flow in a fluidized bed reactor. A granulate of microcrystalline cellulose dried at 100° C. was used in this case. The temperature was increased from 200° C. to 433° C. over many hours. The mass of the granulate decreased from 15.1 g to 3.9 g. The carbon granulate described in DE 10 2006 022 866 A1 is intended to serve as a carrier structure for solid catalysts.

In cfi/Ber. DKG 96 (2019) no. 11-12, pages D9-D12, a thermal powder synthesis process, for example, is described, in which a pulsed gas flow is generated, the gas flow is temperature-controlled, droplets are then generated from a spray liquid, and a powder synthesis and drying and thermal treatment and finally, using cooling air, a sudden stop in synthesis or a stop in the thermal treatment takes place. A filter is used to separate powder from the gas flow. It is described that the process is suitable for a large number of starting materials. Spray calcination is ideal for manufacturing oxide, nitrite and sulfite ceramics as well as other product groups, such as metal oxides. This offers advantages in the production of mixed oxides of the types spinel, perovskite, titanate. The manufacturing of battery components and cathode materials for fuel cells is mentioned.

A method and a reactor for manufacturing specific particles are also described in DE 10 2018 205 152 A1. The method comprises the steps of introducing at least one starting material into a reactor, subjecting the at least one starting material to a thermal treatment of a pulsed process gas flow of in a treatment zone of the reactor, forming particles, and discharging the obtained particles from the reactor. In the method, the temperature control of the process gas flow is decoupled from the generation and maintenance of a pulsation of the process gas flow. Indirect heating offers the advantage that the method is suitable for pharmaceutical manufacturing processes and manufacturing processes in the food industry.

Patent specification DE 103 28 342 B4 relates to a method for manufacturing expanded graphite, in which intercalated graphite is subjected to thermal shock treatment by pulsating combustion in a pulsation reactor. The pulsation reactor described in this context includes a combustion chamber. A fuel/air mixture entering the combustion chamber is ignited and burns very quickly. When introduced into the combustion chamber, the intercalated graphite is introduced in the form of a dispersion, preferably by means of a nozzle, either into the combustion chamber or into a downstream resonance tube in a finely distributed manner, a very rapid dewatering or thermal decomposition of the dispersion medium taking place. Patent specification DE 103 28 342 B4 also relates to the use of the obtained expanded graphite as a conductive component in batteries or fuel cells. It is not specified where the conductivity of the expanded graphite is to be used in the battery.

DE102015219473 describes a method for manufacturing an electrode material for a lithium-sulfur cell, with an electrode-active material which contains a polyacrylonitrile-sulfur composite material. Particles of the polyacrylonitrile-sulfur composite material are at least partially provided with a coating made of a carbon modification. In the method, a composite material made of sulfur and polyacrylonitrile is provided with a coating made of a carbon modification with the addition of a carbon-releasing compound. In this case, a spray pyrolysis of a suspension of previously produced sulfur-polyacrylonitrile composite material together with a carbonising agent, for example a solution of citric acid or glucose, takes place at a temperature of preferably <200° C.

In connection with the manufacturing of anode materials for lithium-ion batteries, attempts have also already been made to coat particles in a targeted manner in gases or to carbonise them in other gases for certain method steps:

Paireau et al. describe in Electrochimica Acta, 2015, 174, pages 361-368, a coating of silicon nanoparticles with polyvinyl alcohol (PVA) by spray drying. Prior to carbonisation, the silicon particles are specifically treated in air at 200° C. for 16 hours in order to crosslink the PVA. The carbonisation takes place in nitrogen at 1050° C. The Si/C composites obtained are to be suitable as anode material for Li-ion batteries.

A similar method is described by Li et al. in Electrochemistry Communications, 2014, 49, pages 98-102. After coating silicon nanoparticles with PVA by spray drying, the PVA-coated silicon nanoparticles are coated with polyacrylonitrile (PAN). The PVA and PAN coated silicon nanoparticles are then stabilized at 250° C. in contact with air and carbonised at 800° C. in contact with argon.

In addition, WO 2017/148871 A1 describes a method for manufacturing precomposite particles, in which mixtures containing silicon particles, one or more oxygen-free polymers, one or more carbon additives based on a carbon modification and one or more dispersing liquids are dried by means of spray drying. A thermal treatment of the precomposite particles accrued during spray drying is also described. This is to take place at 400° C. to 1400° C. and in a tube furnace, a rotary tube furnace or a fluidized bed reactor. For example, a first thermal treatment is to be carried out at temperatures of up to 300° C. in an oxygenated atmosphere and a second thermal treatment at temperatures >300° C. in an inert gas atmosphere.

CN 106207142 A describes a method, in which a polyimide layer is initially synthesized on the surface of silicon nanoparticles from a diamine and a carboxylic acid anhydride. A solvent used in the formation of the polyimide layer, for example N,N'-dimethylacetamide, is removed by spray drying. The spray-dried product is subsequently heated by 3° C./minute to 600° C. and held at this temperature for 1 hour. Additional method steps are required, including crushing so as not to damage the coating, and mixing with graphite powder, before the product can be used in an anode.

CN 106129371 A proposes dissolving citric acid in absolute ethanol, adding a silicon powder pretreated in a certain way with NaOH to the solution, stirring it with ultrasonic treatment and subsequently reacting the resulting mixture to form a silicon-carbon composite by spray pyrolysis in air at 400° C.

The methods described here in connection with the manufacturing of anode materials result in the desired C—Si composite anode materials via a sequence of method steps, which are not able to be performed in this way, or only with great effort, for large production volumes.

The massive expansion of electromobility calls for particularly efficient production methods for high-performance anode materials in order, in the long term, to be able to meet the increased demand for battery capacity on the anode material side as well.

The object of the present invention is to provide a particularly efficient method for continuous manufacturing of homogeneously composed anode material particles.

SUMMARY

This object is achieved by a method for manufacturing a carbon-containing, particulate product, in which a starting material containing a carbonisable precursor material and/or carbon is dispersed in a gas and conducted through a reaction zone, in which at least some of the carbon contained in the product is formed, the gas flowing in a pulsed manner at least in the reaction zone.

The exact meaning of pulsed is described in EP3746215A1. Carbon-containing means that the product may comprise any form of carbon material, in particular a non-graphitic carbon-based material, an amorphous carbon-based material, a graphitic carbon-based material and/or graphite (in unexpanded or expanded form). The IUPAC has defined the materials mentioned here. See *Compendium of Chemical Terminology*, 2nd ed. (the "*Gold Book*"). Compiled by A. D. McNaught and A. Wilkinson. Blackwell Scientific Publications, Oxford (1997). Online version (2019-) created by S. J. Chalk. ISBN 0-9678550-9-8.https://doi.org/10.1351/goldbook. See therein the keyword "non-graphitic carbon" for the non-graphitic carbon-based material, "amorphous carbon" for the amorphous carbon-based material, "graphitic carbon" for the graphitic carbon-based material and "graphite" for graphite.

According to the invention, the starting material contains a carbonisable precursor material and/or carbon. The same applies to the carbon that may be contained in the starting material as was described above for the carbon contained in the product.

Thus, a starting material containing carbon may contain the same carbon materials as indicated above.

The carbon contained in the starting material may preferably be selected from coke particles, carbon black particles, graphite particles, expanded graphite particles, graphenes, ground carbon fibres, carbon nanotubes or vapour grown carbon fibres. This means that the carbonisation only has to be partial, since some of the material to be converted into the product is already carbonised.

A carbonisable precursor material mentioned herein is present if the precursor material has a material yield of at least 10 wt. %, in particular, at least 20 wt. %, when heated in an $N_2$ atmosphere. This is tested by weighing approximately one millilitre of precursor material, heating in an $N_2$ atmosphere at a heating rate of 1 K/minute to 900° C. and then holding the sample at 900° C. under the $N_2$ atmosphere for a further 10 minutes. The residue is weighed again. If the mass on the second weighing is at least 10% of the mass on the first weighing, the material yield is at least 10 wt. %. The mass fraction of carbon in the residue may be at least 80 wt. %, for example at least 90 wt. %. The carbonisable precursor material may preferably be selected from pitches (e.g. coal tar pitches or petroleum pitches), bitumen, heavy oils, resins (e.g. phenolic resins, furan resins, epoxy resins and cyanate ester resins), polyacrylonitriles, polyimides, carbohydrates (e.g. sugar), lignins, polyethylenes, polystyrenes and polyvinyl chlorides or mixtures. Furthermore, the polymers may also include copolymers. This results in an extremely effective access to the product, since particularly favourable educts are used and these are reacted quickly and in large amounts by means of the particularly simple method according to the invention.

According to the invention, the starting material is dispersed in the gas. This may take place through any suitable inlet. The inlets cited in DE 10 2018 205 152 A1 are suitable, in particular a nozzle, for example a spray nozzle. The starting material is conveyed through the nozzle, being split in the process into numerous small droplets that are dispersed in the gas. Depending on the melting point and viscosity of the starting material, a person skilled in the art adjusts the temperature of the starting material appropriately in order to be able to disperse it thoroughly in the gas flow using the nozzle.

The starting material dispersed in the gas is conducted through the reaction zone. There are two fundamentally different ways of conducting the dispersed material through the reaction zone. The gas and the material dispersed therein may be conducted countercurrently to one another. The reaction zone is then preferably oriented vertically, so that the material dispersed in the gas sinks downwards in the reaction zone counter to the flow direction of the gas. A particle outlet is then preferably situated below the reaction zone. At the particle outlet, the generated particles are removed from the system via a lock system. The gas and the material dispersed therein may be conducted concurrently with one another. The effect of this is that the gas and the material dispersed therein may be conducted through the system together and different temperature zones and turbulence zones may be passed through in a targeted manner.

According to the invention, at least some of the carbon-containing product is formed in the reaction zone. To this end, the temperature of the material dispersed in the gas in the reaction zone is increased to the point that carbon is formed. The carbonisable precursor material contained in the starting material may serve in this case as the source of the carbon that forms. At least some of the carbonisable precursor material is then carbonised in the reaction zone and at least some of the carbon contained in the product is thus formed therefrom. At least some of the carbon then arises directly from the carbonisable precursor material, without having to add a further carbon source to the process. This is preferred because liquefiable carbonisable precursor materials may then be readily used. The liquefied precursor material may then simultaneously serve as a carrier liquid, in which a solid component also contained in the starting material, for example carbon or the submicromaterial (or its precursor) described in greater detail below, may be dispersed. Such a dispersion may be conveyed continuously through the inlet by means of a pump, thereby making a particularly efficient process management possible. If necessary, an organic solvent, for example xylene, in which certain carbonisable precursor materials may be partially or completely dissolved, may also be added to sufficiently liquefy the precursor material. The starting material is thus preferably at least partially liquid. This is advantageous because the starting material is then able to be dispersed in the form of fine drops in a laminar or turbulent flow of the gas by means of nozzles (one-material nozzle, two-material nozzle, three-material nozzle, ultrasonic nozzle, centrifugal atomizer, etc.). However, any other carbonisable substance which is supplied to the reaction zone may also serve as the source of the carbon that forms, for example hydrocarbons, which are described in greater detail below and which may form a reactive component of the supplied gas.

Because the gas flows in a pulsed manner in the reaction zone, a turbulent flow is maintained in at least part of the reaction zone.

Depending on the composition of the mixture of gas and (starting) material dispersed therein that is present in the reaction zone, very different temperatures may be necessary for at least some the carbon contained in the product to form in the reaction zone. It is well known that certain carbonisable precursor materials, for example carbohydrates, react to form a carbon residue at very low temperatures, whereas more extreme conditions are required for carbonisation of thermally stable carbonisable precursor materials.

In general, the material dispersed in the gas is heated in the reaction zone to a temperature of at least 200° C., preferably at least 400° C., more preferably at least 600° C., for example at least 800° C.

The carbon-containing, particulate product obtained via typical process management according to the invention is suitable as anode material for a battery. The invention thus relates to a method for manufacturing a carbon-containing, particulate product for an anode of a battery.

Typically, the carbon-containing, particulate product has a specific discharge capacity for a charge carrier selected from Li, Na, Al, Mg, Zn, preferably for Li, which capacity is at least 100 mAh per gram.

The discharge capacity is determined by manufacturing electrodes and then analysing them in laboratory half cells (button cells 2016) using a Maccor 4000 battery test device. For the manufacturing of electrodes, 80 parts by mass of the carbon-containing, particulate product are mixed with 8 parts by mass of CMC binder (approx. 700,000 g/mol, commercially available from Acros), 12 parts by mass of conductive carbon black Super P (commercially available from Imerys) and deionized water to form an ink. The amount of water is selected as needed to adjust the viscosity of the relevant ink. The ink is coated onto a copper foil (rough, thickness 20 µm, commercially available from Schlenk) using a table-top film applicator with a defined blade gap height for the desired loading per unit area. The coating is dried in a controlled manner and round electrode plates (diameter 14 mm) suitable for 2016 button cells (tools and housing parts for button cell construction are all commercially available from Hohsen) are subsequently punched out. The electrode mass on the copper foil is determined by weighing, for which purpose the mass of the copper is subtracted from the weight of the electrode plate. The electrode plates are dried (vacuum, >110° C.) and subsequently placed in an argon-filled glove box with round, punched-out lithium foil (diameter 16 mm, commercially available from Alfa Aesar) as a counter electrode and a separator (GF/D, commercially available from Whatman) and an electrolyte to form button cells (half cells). The electrolyte (ready-mixed commercially from UBE) had the following composition: 1 mol/L lithium hexafluorophosphate dissolved in ethylene carbonate/ethyl methyl carbonate (1:1, vol.)+2% vinylene carbonate+10% fluoroethylene carbonate.

The cells are charged and discharged ("cycled") in a controlled manner on a battery test device (Maccor, Series 4000), with the lithium counter-electrode in the half-cell structure also serving as a potential reference. The battery test is performed as follows: formation (3 cycles): charging: 0.1 CCC to 20 mV, CV to C/100; discharging: 0.1 C CC to 1.5 V. Cycling (after formation): charging: 0.5 C CC to 20 mV, CV to C/20; discharging: 0.5 C CC to 1.5 V (CC=constant current, CV=constant voltage). The specified discharge capacity refers to the first formation cycle. When calculating the specific discharge capacity, only the mass of the particulate product according to the invention is taken into account, i.e., only 80% of the electrode mass on the copper foil calculated by weighing and subtracting.

It is preferred if the gas and the material dispersed therein are conducted (e.g. in a pulsed manner) in such a way that at least some of the starting material and particularly preferably all of the starting material remains continuously dispersed in the gas and is reacted in the gas at least down to the carbon-containing particulate product. The effect of this is that production may be carried out particularly quickly and with minimal outlay in terms of apparatus. Only fluids (or dispersions behaving like fluids) need to be conducted and no solids, as such, need to be handled. The gas, when it flows in a pulsed manner, promotes the formation of turbulence, so that it is easy to keep some or all of the starting material continuously dispersed in the gas and to react it in the gas at least down to the carbon-containing particulate product. If necessary, the frequency or the amplitude of the pulsed gas flow may be optimized accordingly.

The starting material preferably contains a submicromaterial, for example submicroparticles, and/or a submicromaterial precursor, for example a submicroparticle precursor. Alternatively, a submicromaterial precursor, for example a submicroparticle precursor, and/or a submicromaterial, for example submicroparticles, may be directly dispersed in the gas. These two preferred method variants allow an in-situ formation of submicromaterial carbon composite particles, in particular, submicroparticle carbon composite particles.

Silanes (for example, $SiH_4$, $Si_2H_6$) or halogen-containing silanes (for example, $SiH_3Cl$, $SiH_2Cl_2$, $SiHCl_3$, $SiCl_4$ or mixtures thereof), alkyl silanes or alkoxy silanes or comparable tin compounds (stannanes) may be used as submicromaterial precursors, for example the submicroparticle precursors. When certain volatile or gaseous precursors are dispersed directly in the gas, they form a homogeneous mixture with the gas, i.e., they become molecularly dispersed in the gas.

If the starting material contains the submicromaterial or its precursor, only one fluid has to be added to the gas, which is particularly easy to do in a mixing chamber with two inlets. The submicromaterial contained in the starting material then tends to be embedded in the particle matrix in the submicromaterial-carbon composite particles and not enriched on the particle surface. Submicromaterial-carbon composite particles are therefore accessible with these two preferred method variants, the submicromaterial being present in the form of particles, fibres and/or layers in a targeted manner inside and/or outside of the carbon. It may, for example, be present in pores (open and closed local pores), embedded in a C matrix (dense and globally porous matrix) or on the carbon surface.

In these two preferred method variants, it is understood that the submicromaterial precursor, for example the submicroparticle precursor, is converted into a submicromaterial, for example into submicroparticles. Submicroparticles then do not have to be added to the processes. These are formed in situ. This approach is therefore very efficient. In addition, composites with submicromaterials or nanomaterials and properties which would not be accessible with separately added submicromaterials are accessible. Particles or nanoparticles (for example, copper, copper oxide, nickel, etc.) present in the starting material may in this case serve as a catalyst and/or as a crystallisation nucleus in the conversion of the submicromaterial precursor into the submicromaterial, a targeted local deposition of submicromaterial being achievable in the process.

Here, submicromaterial means a material having an average size of <1 μm. Here, submicroparticles means particles having a mean diameter of <1 μm. This is measured by SEM on the particles obtained by the method according to the invention.

Here, submicromaterial preferably means a material having an average size of <800 nm, particularly preferably <500 nm, most preferably <200 nm. Here, submicroparticles preferably mean particles having an average diameter of <800 nm, particularly preferably <500 nm, most preferably <200 nm. Here, submicromaterial preferably means a material having an average size of >10 nm, more preferably >20 nm, most preferably >30 nm. Here, submicroparticles preferably mean particles having an average diameter of >10 nm, particularly preferably >20 nm, most preferably >30 nm. With even smaller sizes, handling may be more difficult because the structures or particles become too reactive. They then also have relatively thick surface layers. The sizes and diameters are measured by SEM.

The submicromaterial preferably comprises a storage material for a charge carrier selected from Li, Na, Al, Mg, Zn. This has the effect of increasing the ion storage capacity compared to pure carbon materials. The storage material is particularly preferably a storage material for lithium and is selected, for example, from silicon and tin. In general, the gas-dispersed material in the reaction zone is heated to a temperature of at most 1600° C. when a submicro-silicon precursor, for example a submicro-silicon particle precursor or a submicro-silicon, for example submicro-silicon particles, is conducted through the reaction zone. It has been shown that the undesirable reaction of silicon with carbon to form silicon carbide is largely prevented if the treatment time is kept short.

It is preferred if the gas in which the starting material is dispersed contains an inert gas component, for example He, Ar, or $N_2$. This may be at least 30 vol. %, for example at least 50 vol. %. The effect of this is that the pyrolytic conversion of the carbonisable precursor material to form carbon is possible with a higher yield, since disruptive side reactions, such as the burning of the carbon, are suppressed. The proportion of molecular oxygen ($O_2$) in the gas in which the starting material is dispersed is generally as much as 8 vol. %, in particular as much as 5 vol. %, preferably as much as 2 vol. %, for example up to 0.5 vol. %.

It is also preferred if the gas in which the starting material is dispersed contains a reactive component, in particular halogens or halogen-containing compounds which may be vaporised under the process conditions, or hydrocarbons, for example methane, acetylene, benzene, toluene, xylene, $H_2$, CO, $CO_2$, $NH_3$, $H_2O$ or ozone. By precisely adjusting the composition of the gas and the temperature in the reaction zone, chemical side reactions such as carbon deposition
silicon deposition
activation (increase in pore volume and surface area)
reduction
oxidative crosslinking
oxidative cleaning of the carbon from metal impurities (ash)
may be controlled in a targeted manner.

The mass fraction of reactive gas in the gas within the reaction zone typically decreases. The effect of this is that the success of at least one of the side reactions may be assessed by determining at least one reactive component in the gas flow.

At least some of the gas is preferably circulated so that it flows at least through the reaction zone several times. The effect of this is that the process becomes more economical, since inert gases are relevant cost factors and a complex purification of non-recycled portions of the gas flow may be omitted.

The gas flowing in a pulsed manner at least in the reaction zone results in a turbulent flow within the reaction zone. DE 10 2018 205 152 A1 describes in detail how a pulsed flow may be maintained in a reaction zone, even without a combustion waste gas flowing through the reaction zone. With regard to the technical implementation of a pulsed flow in connection with the present invention, reference is made to DE 10 2018 205 152 A1.

The method according to the invention is preferably carried out in such a way that the gas pulsates at a frequency of at least 1 Hz but no more than 50,000 Hz, for example no more than 5000 Hz.

The possibility of bringing about turbulence in the reaction zone in a targeted and controlled manner yields multiple advantages, which will be briefly discussed below.

The (starting) material dispersed in the gas may be heated very quickly, for example by at least 10 K, in particular by at least 20 K, preferably at least 40 K, particularly preferably at least 70 K, within 0.1 seconds. With the rapid heating, a very homogeneous material and temperature distribution may also be ensured. Ultimately, this results in a particulate product in which each particle has passed through almost exactly the same sequence of conditions (reaction conditions and thermal conditions), and consequently results in a particularly homogeneously composed particulate product. This is particularly important for electrode materials, for example for anode materials; particularly for submicromaterial-carbon composite particles in which the submicromaterial comprises silicon or tin, in which large amounts of lithium may be intercalated. Here, particularly homogeneous manufacturing conditions are extremely important with regard to the reliability of the battery.

A special feature of the method according to the invention is that gas-liquid-solid reactions may be brought about in a targeted manner. For example:

solids may be converted to gases (pitch→pyrolysis gases)
liquids to gases (toluene→evaporate) and/or
all gases, for example resulting gases, to solids (pyrolysis gases/gaseous toluene→carbon)
so that reactive gases are released in a targeted manner from solid carbonisable precursor material and/or carbon, for example. In the case of reactive gases, an in-situ coating of the material dispersed in the with carbon may in turn be effected.

A further special feature of the method according to the invention is that the extraordinarily rapid heating may promote the sublimation of solids that are difficult to sublimate or the evaporation of semi-volatile liquids in comparison to competing decomposition reactions. The resulting portions of the gas may then contribute to the formation of a carbon layer on the material dispersed in the gas.

The material dispersed in the gas does not have to be conducted directly into the reaction zone. The invention also encompasses methods in which the starting material is first conducted through a pre-treatment zone. There, the starting material is converted into a pretreated material, for example, by polymerisation, crosslinking and/or by the creation of pores. The pretreated material may then be conducted through the reaction zone. This allows the particle structure or morphology to already be partially defined prior to carbonisation. The polymerisation and/or crosslinking in the pretreatment zone may be carried out by irradiation, increasing the temperature and/or by supplying an initiator or catalyst of the polymerisation or crosslinking reaction. Pores may be produced by increasing the temperature in the pretreatment zone to the point that a more volatile component of the starting material passes into the gas phase and at least partially escapes from the remaining starting material via the resulting pores. The more volatile component may also originate from decomposition, for example from an ammonium compound or from other gas-forming chemical reactions. The effect of this is that the pores within the remaining starting material become accessible to reactive components of the gas. The success of the pretreatment, for example the extent of the pore formation, the progress of the polymerisation or the progress of the crosslinking, may be determined directly or indirectly. A process parameter that is decisive for the success of the pretreatment may be adjusted if the pretreatment is not successful to the desired extent. The starting material may comprise at least 0.1 wt. % of more volatile components, which boil or decompose at the pressure and temperature conditions prevailing in the pretreatment zone. The effect of this is that pores form in the carbon material and that potentially further reactive components are formed, which in turn decompose to form carbon at elevated temperatures.

The particles obtained from the reaction zone may be further processed. Further processing, also according to the invention, may comprise: separation of the particles, for example with a sifter; mixing of the particles with other particles, wherein the other particles may include, for example, graphite particles; and/or mixing the particles with a binder to form an anode material mass. According to one development of the method according to the invention, the anode material mass may be applied to an electrical conductor in order to produce an anode for a battery.

According to the method according to the invention, certain carbon-containing particulate products are accessible, which form a further subject matter of the invention.

The invention thus also relates to a carbon-containing particulate product, in particular an anode material for a battery (e.g. submicromaterial-carbon composite particles, in which the submicromaterial comprises silicon or tin), having at least partially inaccessible matrix regions for xylene in the pycnometric determination of the density, the product having a pycnometrically determined density that is at least 10%, preferably at least 15%, in particular at least 20%, very particularly preferably at least 25%, lower than a ground sample of the same carbonised particle material, and an average sphericity $\psi$ in the range of 0.35 to 1, preferably in the range of 0.55 to 1 and most preferably in the range of 0.85 to 1.

A ground sample of the same carbonised particulate material is prepared by pulverising the powder by means of a ball mill. The powder is poured into a grinding container that is already loaded with grinding balls (e.g. steel balls). This grinding container is then rotated using a suitable device, for example a roller block. After grinding, the powder is removed from the grinding container and xylene pycnometry is carried out. The grinding is carried out until the average particle size ($d_50$) is e third of the initial particle size. The particle size ($d_50$) is determined in each case by laser diffractometry.

The sphericity $\psi$ is the ratio of the surface area of a sphere of equal volume to the actual surface area of a body (definition by Wadell). Sphericities may be determined, for example, from conventional SEM recordings.

The carbon-containing particulate product, in particular the anode material for a battery (for example, submicromaterial-carbon composite particles in which the submicromaterial comprises silicon or tin), can be obtained by the method according to the invention. In this case, anode material particles may be provided which are spherical to a good approximation, at least with regard to their shape. Homogeneously composed anode material particles are thus provided.

The submicromaterial-carbon composite particles according to the invention, in which the submicromaterial comprises silicon or tin, are in this case preferably submicroparticle carbon composite particles, in which the submicroparticles are selected from submicro-silicon particles and submicro-tin particles. Such particulate products according to the invention preferably meet the following condition:

$$d50_{sub} \cdot \frac{x_c}{x_{sub}} > s$$

where
    $d50_{sub}$ is the mean submicroparticle size in the unit "pm",
    xc is the mass fraction of carbon in the total mass of the particulate product,
    $X_{sub}$ is the mass fraction of the submicroparticles in the total mass of the particulate product, and
    s is a safety parameter which is 0.02, in particular 0.03, preferably 0.04, particularly preferably 0.05.

If, for example, there were small submicro-silicon particles with $d50_{Si}$ of 0.01 μm (=10 nm), the proportion of carbon would have to be more than twice as high as the proportion of silicon in order to fulfil the above inequality. With a $d50_{si}$ of 0.03 μm (=30 nm), the above inequality is already fulfilled if there is slightly more silicon than carbon.

If the proportions of carbon and silicon in the particulate product are matched to the silicon particle size according to the above condition, sufficient silicon coverage with carbon or silicon embedding in carbon is always ensured, regardless of the silicon particle size. The condition requires namely a larger mass fraction of carbon when using smaller silicon particles with a particularly large surface area. When using larger silicon particles having a smaller specific surface area, however, smaller mass fractions of carbon are also possible. This ensures that the silicon surface area accessible to the electrolyte is as small as possible, regardless of the silicon particle size. It is assumed that a small electrolyte-accessible silicon surface area results in more uniform and reduced SEI formation, as well as in a more uniform current density distribution to and from the anode, ultimately making the battery more reliable. In addition, the silicon covering, or the silicon embedding, complicates the breaking out of silicon particles from the composite. The electrical contact between the individual silicon particles and the current collector then remains more reliable. Due to the continued electrical contact, the particles participate better in the charging and discharging processes in the battery and thus remain active. This mitigates the capacity losses associated with repeated charging and discharging. The same applies analogously to tin particles.

The carbon-containing particulate product, particularly the anode material for a battery (for example, submicromaterial carbon composite particles, in which the submicromaterial comprises silicon or tin), preferably comprises core-shell particles, for example, core-shell composite particles. It was previously emphasized above that in the method according to the invention, carbon may be separated from the gas phase. This may be used with particular advantage to integrate a coating of the particulate product directly into the process, so that this coating forms the shell of a core-shell composite particle.

A further subject matter of the invention relates to the use of a particulate product according to the invention or of a particulate product obtained by a method according to the invention for producing an anode for a battery.

The invention is illustrated by the following figures without being restricted thereto.

BRIEF DESCRIPTION OF THE FIGURES

FIG. 1 shows a diagrams of systems for carrying out methods according to the invention.

DETAILED DESCRIPTION

Figure 1:
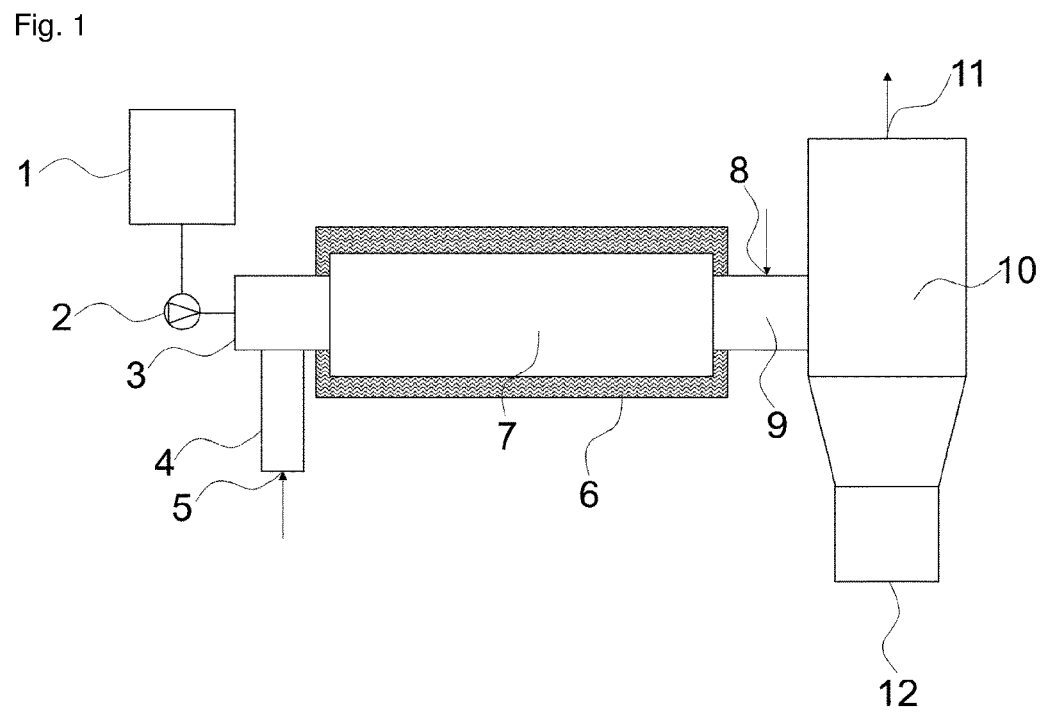
Figure 2:
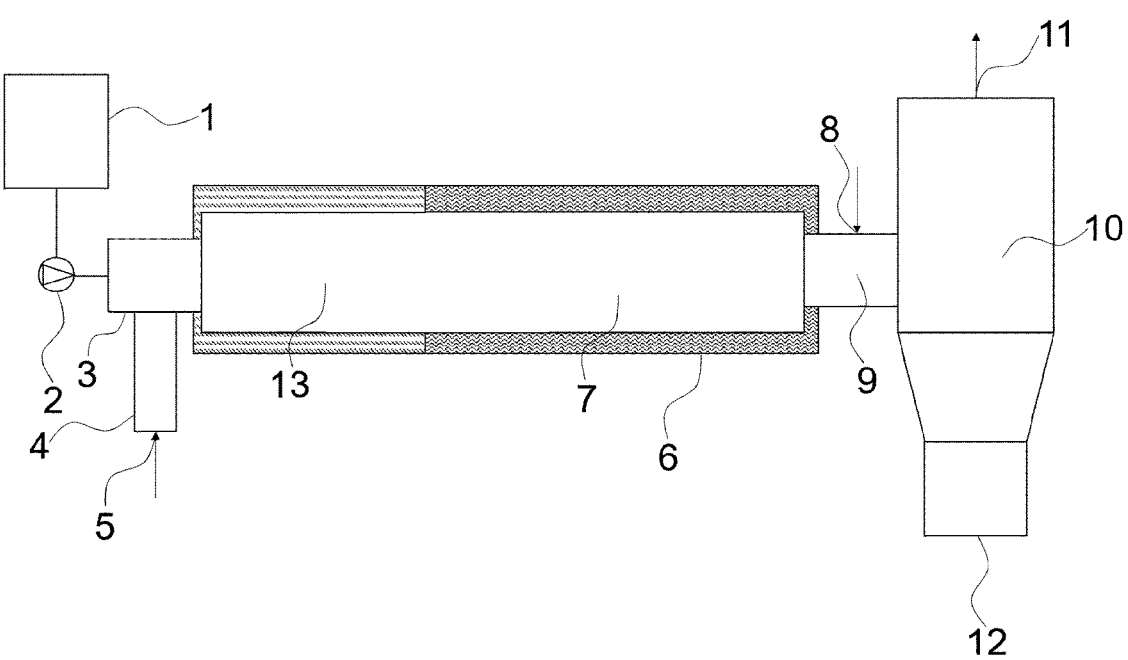
FIG. 2 shows a diagram of systems for carrying out methods according to the invention.
Figure 3:
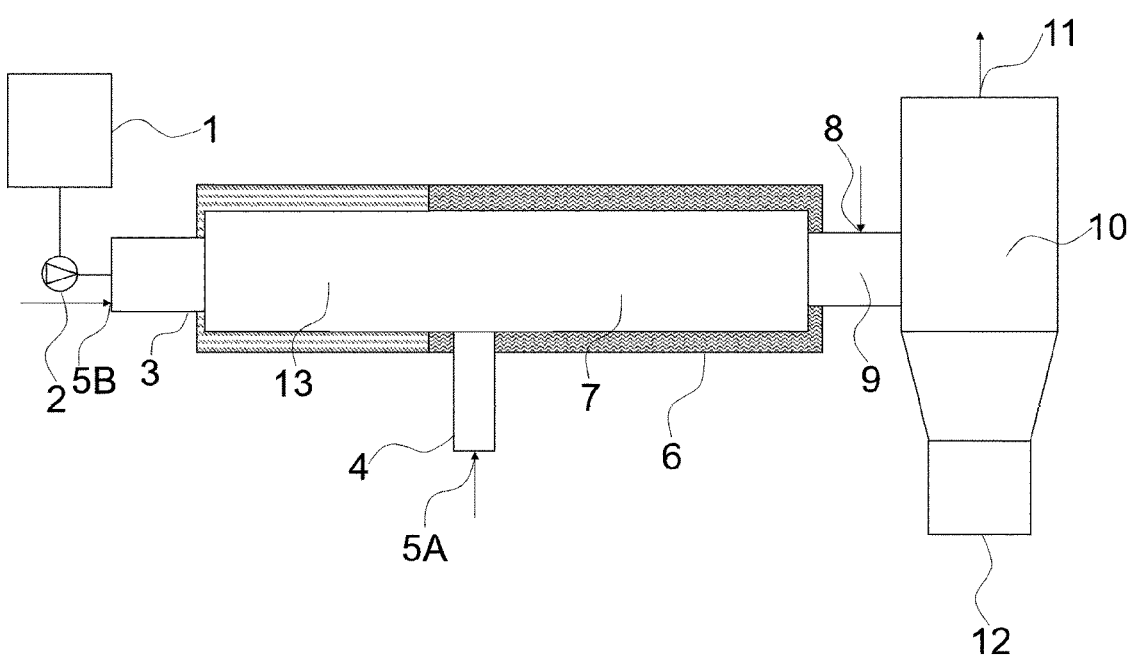
FIG. 3 shows a diagram of systems for carrying out methods according to the invention.

A method according to the invention for producing a carbon-containing, particulate product, which is suitable as anode material for a battery, may be carried out in systems as schematically shown in FIGS. 1 to 3. In this case, a starting material, for example a dispersion containing silicon submicroparticles, pitch and xylene, is sprayed into a mixing chamber 3 from a storage container 1 via a pump 2 and a nozzle (not shown here). The pitch is a carbonisable precursor material. The amount of xylene is chosen such that the starting material is at least partially liquid and is flowable enough to be conveyed through the pump. In addition, the starting material could in particular also contain carbon, for example dispersed graphite particles and/or soot particles. The starting material is dispersed in a gas via the nozzle 5 and conducted via the pulsation unit 4 into the mixing chamber 3. The gas supplied via the gas inlet 5 may, for example, consist predominantly of molecular nitrogen and may contain reactive components such as, for example, hydrocarbons, and very small amounts of molecular oxygen. The starting material dispersed in the gas is conducted through a reaction zone 7 located in a reactor 6 equipped with a heating jacket. The material dispersed in the gas is heated in the reaction zone 7 to a temperature of 800° C. to 1400° C., so that pitch is carbonised in the reaction zone 7, and thus at least some of the carbon contained in the product is formed therefrom. The pulsation unit 4 ensures that the gas flows in a pulsed manner at least in the reaction zone 7, and pulsates, for example, at a frequency of 500 Hz. In the pulsation unit 4, a pressure gradient is maintained across a passage, which opens and closes alternatingly at the desired frequency, so that a pressure pulse maximum occurs immediately behind the passage in the gas flow direction whenever gas flows via the opened passage, and a pressure pulse minimum occurs immediately behind the passage in the gas flow direction whenever the passage is closed. The pressure waves generated in this way propagate through the reaction zone 7. The gas and the material dispersed therein are conducted in such a way that the starting material remains continuously dispersed in the gas and is reacted in the gas to form the carbon-containing particulate product. The gases discharged from the reaction zone 7 and the particulate product dispersed therein are mixed in a cooling zone 9 with a cooling gas supplied via the cooling gas inlet 8 and then conducted into the particle separator 10. The particulate product is obtained from the particle separator via particle outlet 12. Gaseous components of the flow conducted into particle separator 10 pass through gas outlet 11.

In the systems according to FIGS. 2 and 3, the starting material dispersed in the gas is first passed through a pretreatment zone 13. The starting material dispersed in the gas is heated in the pretreatment zone 13 to a temperature of 100° C. to 300° C. Even small amounts of molecular oxygen in this case may function as an initiator of radical reactions, which result in a desired crosslinking of low-volatility organic components of the starting material.

FIG. 3 indicates that not all of the supplied gas has to be conducted through the pulsation unit 4 and that the pulsation unit does not have to be located upstream of the mixing chamber 3. In the example shown here, of two gas inlets 5A, 5B, one gas inlet 5A leads directly into the mixing chamber 3 and the other gas inlet 5B leads directly into the pulsation unit 4.

LIST OF REFERENCE SIGNS

1 Storage container
2 Pump
3 Mixing chamber
4 Pulsation unit
5, 5A, 5B Gas inlet
6 Reactor
7 Reaction zone
8 Cooling gas inlet
9 Cooling zone
10 Particle separator
11 Gas outlet
12 Particle outlet
13 Pre-treatment zone

The invention claimed is:

1. A method for manufacturing a carbon-containing particulate product, comprising:

supplying a carrier gas into a mixing chamber via a nozzle;

dispersing a starting material containing a carbonisable precursor material and/or carbon in the carrier gas by spraying the starting material into the mixing chamber;

conducting the gas and the material dispersed therein via a pulsation unit into a reaction zone;

conducting the gas and the material dispersed therein through the reaction zone, in which at least some of the carbon contained in the product is formed;

wherein the pulsation unit provides that the gas flows in a pulsed manner at least in the reaction zone;

wherein the gas pulsates at a frequency between 1 Hz and 50,000 Hz; and wherein the material dispersed in the gas is heated in the reaction zone at a rate of at least 10 K within 0.1 seconds to a temperature between 800° C. and 1400° C.

2. The method according to claim 1, wherein the carbon-containing particulate product has a specific discharge capacity for a charge carrier selected from Li, Na, Al, Mg, Zn, which capacity is at least 100 mAh per gram.

3. The method according to claim 1, wherein the gas and the material dispersed therein are conducted in such a way that at least some of the starting material remains continuously dispersed in the gas and is reacted in the gas at least down to the carbon-containing particulate product during passage through the reaction zone.

4. The method according to claim 1, wherein in the reaction zone at least some of the carbonisable precursor material is carbonised and at least some of the carbon contained in the product is formed therefrom, and wherein at least some of the carbon arises directly from the carbonisable precursor material without requiring an addition of a further carbon source.

5. The method according to claim 1, wherein the starting material contains a submicromaterial precursor and/or a submicromaterial, or a submicromaterial precursor and/or a submicromaterial is/are dispersed in the gas.

6. The method according to claim 5, wherein the submicromaterial precursor is reacted to form a submicromaterial.

7. The method according to claim 5, wherein the submicromaterial comprises a storage material for a charge carrier selected from Li, Na, Al, Mg, Zn, which capacity is at least 100 mAh per gram.

8. The method according to claim 1, wherein the starting material is at least partially liquid.

9. The method according to claim 1, wherein the carbonisable precursor material is selected from pitches, bitumen, heavy oils, resins, polyacrylonitriles, polyimides, carbohydrates, lignins, polyethylenes, polystyrenes, polyvinyl chlorides or mixtures thereof and/or the carbon contained in the starting material is selected from among coke particles, carbon black particles, graphite particles, expanded graphite particles, graphenes, ground carbon fibres, carbon nanotubes or vapour-grown carbon fibres or mixtures thereof.

10. The method according to claim 1, wherein the gas in which the starting material is dispersed contains an inert gas component.

11. The method according to claim 1, wherein the gas and the material dispersed therein are conducted through the reaction zone cocurrently with one another.

12. The method according to claim 1, wherein, in the pulsation unit, a pressure gradient is maintained across a passage that opens and closes alternatingly at the frequency of pulsation, so that a pressure pulse maximum occurs immediately behind the passage in a gas flow direction whenever gas flows via the opened passage, and a pressure pulse minimum occurs immediately behind the passage in the gas flow direction whenever the passage is closed.

* * * * *